United States Patent [19]

Cuttill et al.

[11] 4,017,834

[45] Apr. 12, 1977

[54] CREDIT CARD CONSTRUCTION FOR AUTOMATIC VENDING EQUIPMENT AND CREDIT PURCHASE SYSTEMS

[76] Inventors: William E. Cuttill, 907 Newport Drive, Fenton, Mich. 48430; Vilma M. Wagner, 1081 W. Yale, Flint, Mich. 48503

[22] Filed: Jan. 8, 1975

[21] Appl. No.: 539,330

Related U.S. Application Data

[63] Continuation-in-part of Ser. No. 357,509, May 4, 1973, Pat. No. 3,872,438.

[52] U.S. Cl. .................. 340/149 A; 235/61.11 H; 283/7
[51] Int. Cl.² .................. G06K 7/08; G06F 7/00
[58] Field of Search ........... 340/149 A, 166 R, 173; 29/25.42; 40/2.2; 283/6, 7; 235/61.11 H, 61.12 N

[56] References Cited

UNITED STATES PATENTS

| | | | |
|---|---|---|---|
| 3,015,087 | 12/1961 | O'Gorman | 340/149 A |
| 3,245,697 | 4/1966 | Nugent | 283/7 |
| 3,604,900 | 9/1971 | Kalt | 235/61.12 N |
| 3,627,993 | 12/1971 | Cooper, Jr. | 235/61.11 H |
| 3,716,439 | 2/1973 | Maeda | 40/2.2 X |
| 3,731,065 | 5/1973 | Zucker | 235/61.12 N |
| 3,836,754 | 9/1974 | Toye et al. | 235/61.12 N |

*Primary Examiner*—Donald J. Yusko
*Attorney, Agent, or Firm*—Harry R. Dumont

[57] ABSTRACT

A special credit card arrangement and construction is employed with the credit card precoded in binary code representing several digits and with a locator indicator to insure that the card is correctly positioned when inserted in the console or readout station. The card coding includes an arrangement of high dielectric constant spots or discs and low dielectric constant spots or discs arranged in several bit groupings related to a plurality of identification digits. In one embodiment of the cards, which are preferably of the plastic material type, opaque conductive plastic inserts may additionally be included over and above the first mentioned discs so that the discs, their location and code arrangement cannot be readily ascertained.

15 Claims, 20 Drawing Figures

ALARM-TOO MANY ERRORS

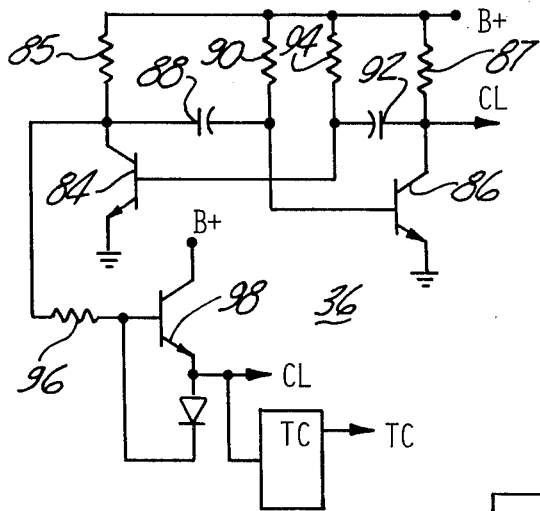
*Fig-5*
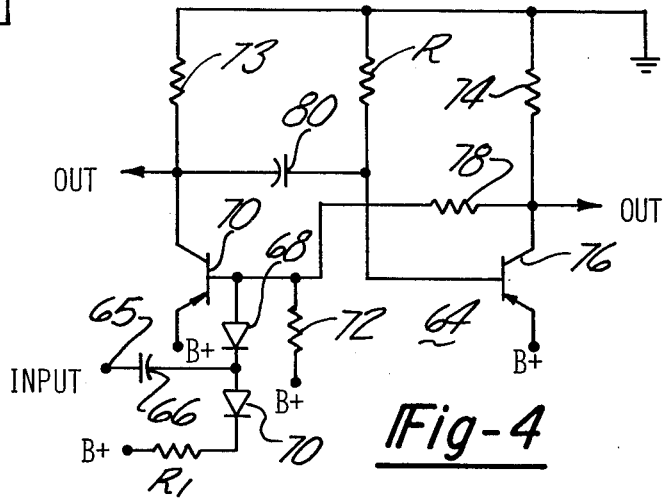
*Fig-4a*
*Fig-4*
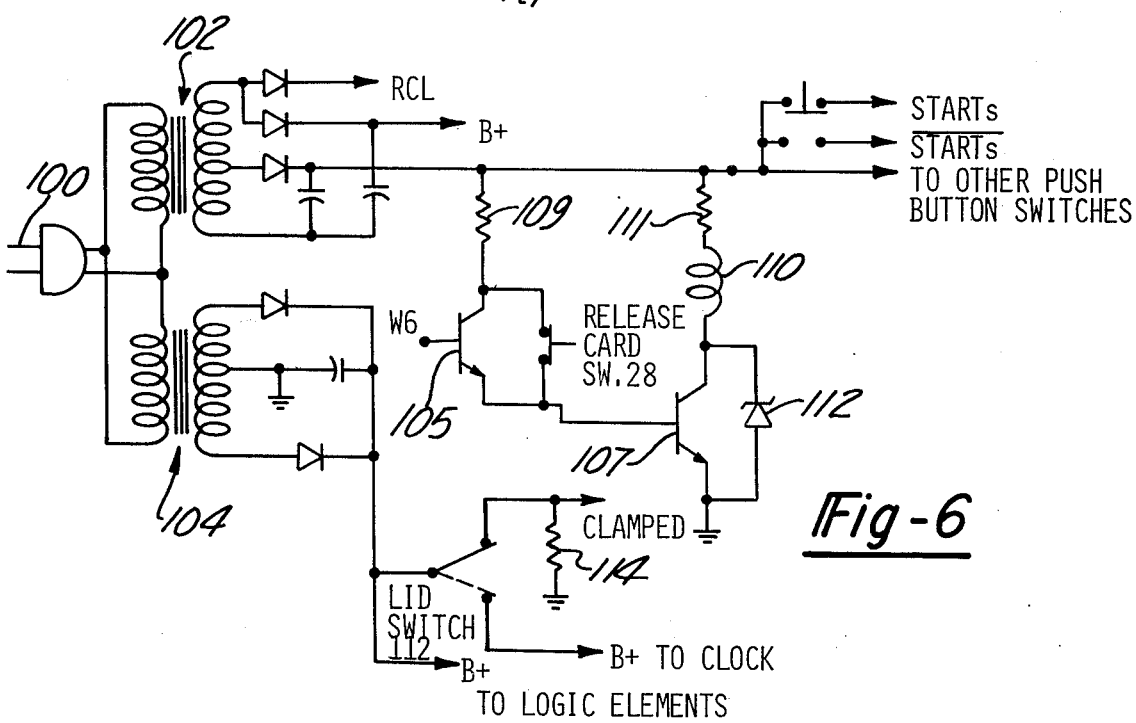
*Fig-6*

| | BC1 | BC2 | BC3 | BC1 | BC2 | BC3 |
|---|---|---|---|---|---|---|
| S | CL2-5 | CL3-3 | CL3-5 | CL1-3 | CL1-5 | CL2-3 |
| C | CL2-7 | CL3-1 | CL3-7 | CL1-1 | CL1-7 | CL2-1 |
| T | CL2-6 | CL3-2 | CL3-6 | CL1-2 | CL1-6 | CL2-2 |
| O | CL2-8 | CL3-14 | CL3-8 | CL1-14 | CL1-8 | CL2-14 |
| I | CL2-9 | CL3-13 | CL3-9 | CL1-13 | CL1-9 | CL2-13 |
| Cd | CL2-10 | CL3-12 | CL3-10 | CL1-12 | CL1-10 | CL2-12 |

CREDIT CARD CONSTRUCTION FOR AUTOMATIC VENDING EQUIPMENT AND CREDIT PURCHASE SYSTEMS

REFERENCE TO RELATED APPLICATION

This application is a continuation-in-part of our co-pending application Ser. No. 357,509, filed May 4, 1973, now U.S. Pat. No. 3,872,438 for "Credit Card and Credit Card Identification System for Automatic Vending Equipment".

BACKGROUND OF THE INVENTION

A number of automatic vending equipment systems are known to the prior art which are enabled in their operation through coins and bills. A great number of systems, mechanical, optical and electrical, have been developed for identifying the currency, verifying its authenticity, and then permitting operation of the vending equipment. Further, a few additional systems have taken the further step forward to provide systems in which the automatic vending equipment much more conveniently is controlled by credit identification cards used by the operator. One type of such system is shown in Goldenberg U.S. Pat. No. 2,792,148 issued on May 14, 1957, in which a relatively simple system is used with the credit cards having a magnetized insert for identification and/or notches formed in the margin of the card. This system, outside of requiring a signature by the purchaser, did not make any provision against the purchaser having fraudulently obtained and used the credit card issued to another. An additional automatic vending apparatus operated by a credit card means is shown and described in Harris U.S. Pat. No. 25,254, issued on Oct. 9, 1962. In that patent, the card incorporated a precoded portion, including a distinguishing light pattern formed by a photographic strip. In addition, there was described a system for actuating microswitches by means of raised lettering or type on the card. Here again, the system is deficient in that there is no validating means or system for insuring that the card is being used by a purchaser to whom the card was originally issued.

SUMMARY OF THE PRESENT INVENTION

The present invention will thus be seen to provide an advancement in credit card systems and in automatic vending systems, particularly with respect to the structure and fabrication of the credit card employed.

With respect to the coded credit card, it is fabricated in such manner that the card code incorporated in it cannot be readily detected by one examining it. The card is constructed in such manner that it is low-cost and durable.

The electronic system in which the card is used is relatively simple with respect to its components and its manufacture and, as it will be seen in the accompanying specification, is constructed largely from integrated circuits which are readily available, are easily assembled and operate with a relatively low power consumption. The system is practically "fool-proof" in its operation and includes a number of features which lead to this result. For example, there is included a start button system with insurance that the card has been properly located in the read station under the lid for reading. After proper location of the coded card, there is a lighted panel provided which instructs the purchaser to select the first digit of the code, with the first digit being known only to the purchaser but not entered in a legible or visible fashion on the card. After the purchaser has depressed and released the first digit button on the keyboard, a further light instructs him to select the second digit of the code known to him, and the process is continued according to the present embodiment until the purchaser has selected a total of four digits.

In the event the purchaser has made an error in his selection of the digits, a light signal informs him that he has selected the wrong code and he is instructed to push the reset button and to make a second selection of the code.

Actuation of the reset button permits the purchaser to make another four digit selection on the keyboard. In the event the next code he selects is likewise incorrect, he is permitted to push the reset button and again attempt to enter the proper code from memory. After a predetermined number of incorrect attempts, which may range from one to seven according to the judgment of the vending machine user, there is provided a "select first digit of code" light which stays illuminated regardless of what the purchaser does and his credit card is retained in place in the read station. Alternately, the system may provide for dropping the card into a card capture receptacle. In the latter event, after the card has been captured in the receptacle, the system is reactivated for the next user. In addition, an alarm may be employed to call an attendant or perhaps even actuate a police call.

If, as more often occurs, the purchaser selects the proper code prior to the alarm and lock-out, when he releases the fourth digit button, he will be informed by a further light signal that his code was correct and the equipment is now conditioned so that he may make his purchases. This signal also activates the vending equipment and places it in a condition so that he may select and remove the objects desired.

It will be understood that the system may be used for a great number of types of vending equipment in which the individual articles are separately priced and arranged perhaps in conveyorized position for the purchaser. It likewise may be used for bulk dispensing equipment, such as gasoline pumps, in which it is possible to remove a predetermined amount of the fluid and provide read-out, for example, through the rotary dial on the pump. As another example, the customer may select a quart of oil for 65 cents, with this amount being entered in a down-counter. A clock, associated with the system, may be used to count this counter to zero while a second totalizing counter is counted-up by the 65 cents at the same time. After all of the items have been selected by the purchaser, the amount finally registering in the totalizing counter can be decoded and typed by printer means on the bill.

It will be appreciated that the billing process can be made much more detailed by adding counters to add the number of items, by storing programs in the print-out device to print the number and description of the items purchased, and the like. In the interest os simplification and brevity in this specification, complete and detailed descriptions of such totalizing counters, read-out and print-out systems will not be given since they are well known and familiar to those skilled in the electronic computer and business machine arts.

In the final operation of the system, when the purchaser has completed all his purchases, he activates a "finished" button. This will deactivate the vending equipment and initiate the billing process, with the print-out as already described above. Once the billing is complete, a further light will inform him and thank him for his purchase. With the billing operation completed, the lid located on the read station is released so that he can retrieve his credit card and the completed printed bill.

It will thus be seen that by the present invention there has been provided a greatly improved construction for credit cards, with provision for a novel coding system for identifying the purchaser user prior to the completion of the purchase. The inserts used are far superior to those known in the prior art, for example, magnetic inserts, magnetic ink, raised blocks on the card which are sensed by mechanical sensing fingers, conductive ink which has a tendency to wear off and change its conduction characteristics with aging, and other like indicia which are easily detected. On the other hand, one type of credit card constructed and fabricated in accordance with the present invention is such that the capacitor disc inserts cannot be readily detected by the average person and, even if the bits and their arrangement are located, the code is not obvious from the physical layout.

BRIEF DESCRIPTION OF THE DRAWINGS

The attached drawings illustrate a system provided in accordance with the present invention in which like numerals and letters are used to identify like parts of the system where they may occur in several different drawings, and in which:

FIG. 4 is a combined showing of resistance-capacitance network timing diagram and monostable multivibrator circuit showing a representative delay stage used in connection with the present invention;

FIG. 5 is a schematic showing of a portion of the clock used in connection with the present invention;

FIG. 6 is schematic drawing showing the power supply used to provide the various bias and operating voltages required in connection with the present invention;

DESCRIPTION OF THE PREFERRED EMBODIMENT

Figure 1:
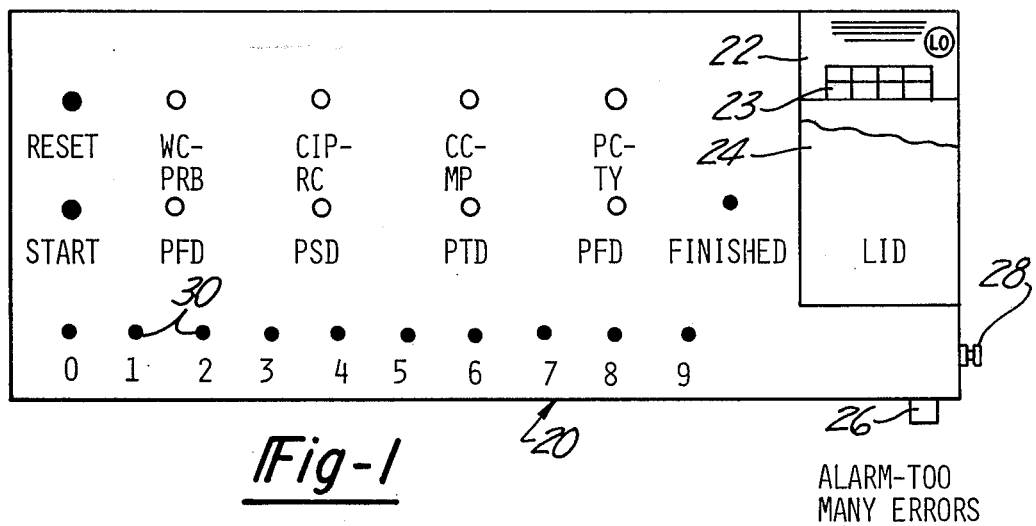
FIG. 1 is a top plan view of the purchase console and card read station, with parts broken away to illustrate the positioning of a credit card constructed in accordance with the invention.

With particular reference to FIG. 1, there is shown the control switch and light indicator array which appear on the purchaser console 20 used to control the credit card purchase operation and, more particularly, the credit card identification and verification system provided by the present invention. In the operation of the system, the credit card indicated by the numeral 22 is placed in position beneath a pivotable lid 24 in such manner that the card 22 has the binary bit information encoded on its upper margin properly aligned in the reading station, while the positioning of the locator bit LO is used to verify that the card 22 is positioned properly in the read station before an identification cycle can be initiated. Also included in the system and connected to the console is an "alarm — too many errors" light 26, together with a card release switch 28 which is positioned at the right hand edge of the console 20. It will be understood that the card release switch 28 is key actuated, that is, placed in a closed condition, only by the use of a key by an attendant connected with the vending establishment. This insures that should the purchaser fail to enter the proper code on the digit keyboard 30, the card which the purchaser probably procured in a fraudulent manner cannot be removed and taken away. The "alarm — too many errors" light or signal 26, which is preferably remotely located from the console is thus used to summon an attendant or the police. Alternately, the vending machine may be utilized in connection with multiple read stations so that should one station be disabled by an attempted fraudulent use and the card retained in it until the following business day, additional read stations will be available for others who desire to operate the automatic vending equipment.

Figure 2:
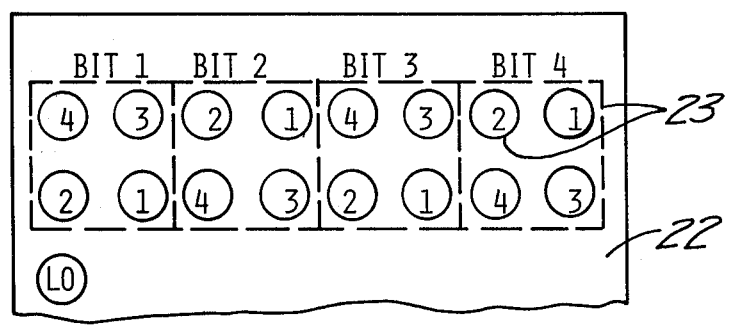
FIG. 2 is a fragmentary view of a credit card incorporating the present invention and particularly showing the binary coded portions of the credit card in one example.

FIG. 2 is a partial showing of a credit card 22 constructed in accordance with the present invention, particularly indicating the arrangement of the preset code on the card, in the present instance being a code for four different digits, each represented by four different bits of the value indicated. Also shown is the relative position of the locator bit LO, which determines through an appropriate signal system later to be described that the credit card 22 has been properly positioned and right-side-up in the reading station. It is important to consider the type of indicia which are used in the credit card 22 to provide the binary code used in the system. It has been found that it is possible to implant or encapsulate a plurality of discs 23 of high dielectric constant between the upper and lower layers of the plastic normally included in the laminated plastic credit card 22. The arrangement and construction of the card will be further illustrated in greater detail in FIG. 3 hereinafter. Alternate embodiments of the credit card 22 will be shown and described in FIGS. 11 and 14 hereinafter. Additional discs 23a are provided in correspondence with the code, which are elements of low dielectric constant. Either the high dielectric constant discs 23 or the low dielectric discs 23a may be embodied as ceramic inserts. Codes are thus provided on the card 22 in seventeen different locations corresponding to the sixteen bit locations indicated in FIG. 2 and the locator disc LO which assures that the card 22 is inserted properly aligned in the read station O. The card 22 itself is of relatively low dielectric plastic material with the high dielectric constant inserts 23 or the low dielectric constant inserts 23a mounted in the card.

Figure 3:
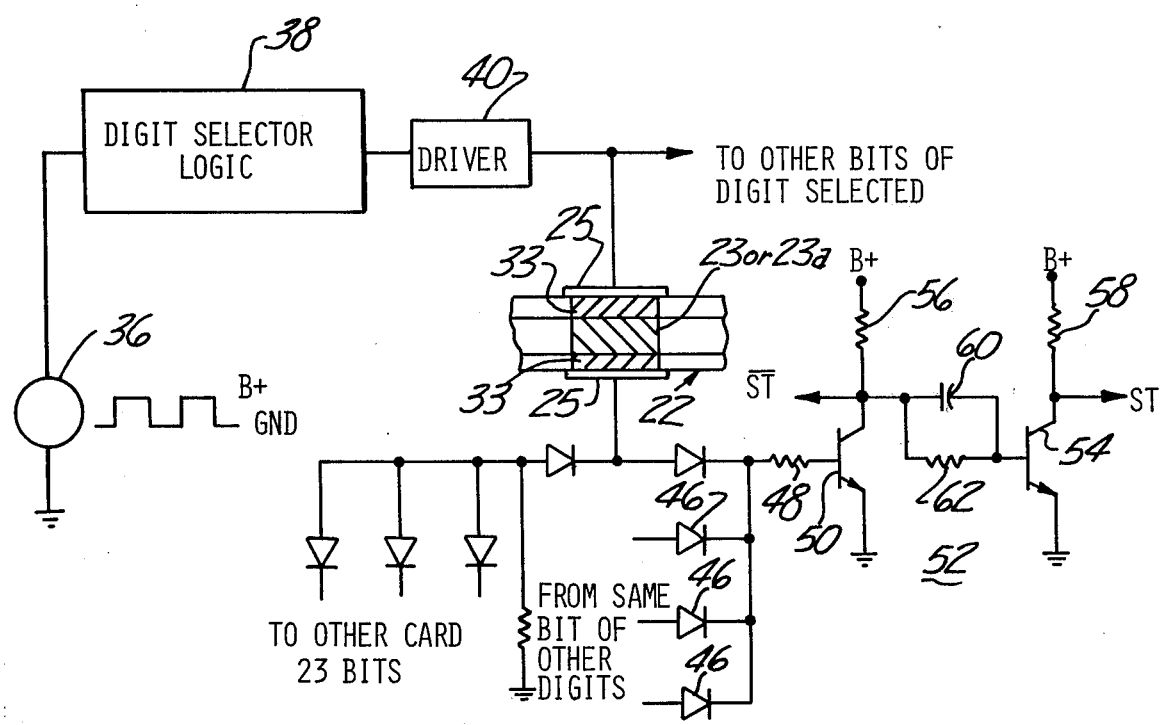
FIG. 3 is a combined schematic and block diagrammatic showing of the present invention, further showing the detail of the operative code indicia incorporated in the credit card.

As will further be clarified in the FIG. 3 drawing, it is desirable to include at the upper and lower sides of each of the discs 23 a conductive opaque disc 33 which has the function of concealing the different disc inserts 23 or 23a in order that a person examining the card cannot tell what pattern is incorporated or what code is being used.

The basic principle on which the system operates is that the preset different capacitance read-outs from the several coded bits on the card 22 provide a reliable index for the read-out system. It will further become apparent that the method of encapsulating the bit material in the credit card 22 provides a long wearing and durable type of credit card, which will be useable for thousands of cycles of operation without showing appreciable wear or change in the preset read-out signal levels. Additional advantages and advancements through the alternate embodiments of FIGS. 11 and 14 will further be described hereinafter.

The basic parts of the read-out system are shown in the FIG. 3 drawing and include a clock pulse source 36 which provides clock pulses at a frequency of, for example, 50 KHz, ranging in amplitude from zero volts to a B+ voltage in a square waveform as indicated on the drawing. The bits 23 of the credit card 22 are shown in contact with the test probes 25 as they are positioned in the read station at either side of the credit card 22. The bits in each case are comprised of a pair of concealing opaque electrically conductive inserts 33 between which are positioned either a high dielectric constant ceramic disc 23 or, alternately, a low dielectric constant ceramic disc 23a. A plus input signal is passed through diodes 46, through signal resistor 48 to the base of an NPN transistor 50 which comprises the input for a Schmitt trigger stage 52 as illustrated.

The Schmitt trigger stage 52 includes a second NPN transistor 54. The collectors of both the transistors 50 and 54 are connected to a B+ voltage source through collector load resistors 56 and 58, respectively. An RC network is connected between the collector of the transistor 50 and the base of the transistor 54, while network includes a parallel connected capacitor 60 and resistor 62. The two output terminals of the Schmitt trigger stage 52 are labeled $\overline{ST}$ and ST as illustrated.

In accordance with the logic system which will be further explained hereinafter, the input to the Schmitt trigger stage 52 for any particular bit being sensed will go high to approximate the preset plus voltage level and the Schmitt trigger output $\overline{ST}$ will go to ground for the approximately ten microseconds that the clock output is at ground. This is a condition which exists if the high dielectric constant ceramic insert 23 is present in the bit being sensed. On the other hand, if a ceramic insert 23a is in the card in the particular bit location, the $\overline{ST}$ output remains at a plus voltage level.

The differences in output between the two Schmitt trigger outputs $\overline{ST}$ and ST are generally quite distinct, but in order to make certain that a difference between the two will be picked up there is provided a time delay in the system called TC, one of which stages is illustrated in FIG. 4. A table, as shown in FIG. 4a, illustrates the four different time delays that have been incorporated in the system, as follows: one, the TC or time constant time delay which is of the order of five microseconds; the time delays TD1 and TD2, which are associated with the comparison circuitry later to be described; and the time delay PO, which represents a print-out time delay which allows for a billing time cycle to be accomplished by associated counters and print-outs used in the system for bill printing.

In a representative system, the TC time delay is 5 microseconds, the TD1 time delay is 100 microseconds, the TD2 time delay is 50 microseconds, and the print-out time delay in the present system is simulating a billing print-out of approximately 25 seconds. In a particular application, this timer could activate the billing device when the customer has completed his purchase. An alternate approach could have the billing device actuated at the same time the vending equipment is energized — for example from D6 in FIG. 10. If desirable, the billing time could be extended even beyond the vending cycle by this timer.

The operation of the TC timing circuit, as illustrated in FIG. 4, is as follows: the two outputs of the delay stage indicated by the numeral 64 are designated as "$\overline{out}$" at the left hand side and out at the right hand side. The input from the clock 36 is provided at the input terminal 65 through a coupling capacitor 66 through diode 68 to the base of the transistor 70. A resistor 72 is connected between the base of the transistor 70 and an appropriate B+ bias voltage source. Load resistor 73 is connected between the collector of the transistor 70 and ground, while a second resistor 74 is connected between the collector of the second delay stage transistor 76 and ground. A resistor R is included in the circuit and a second resistor 78 is connected to limit the base current of the transistor 70 during the timing cycle. The delay is thus determined by the discharge time constant from the capacitor 80 and the resistor R.

Figure 9:
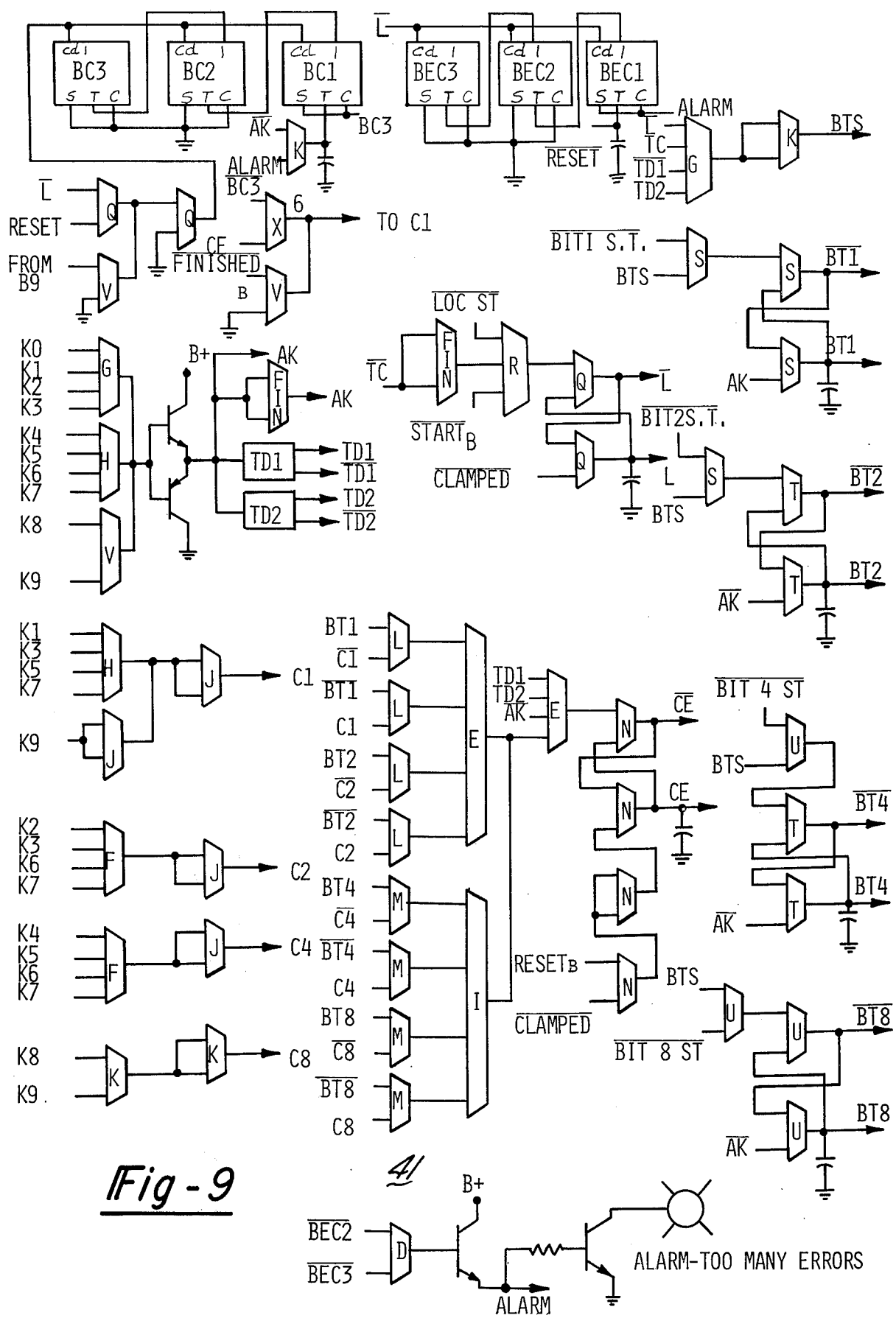
FIGS. 9 and 10 represent combined schematic and logic diagrammatic showings of the logic system incorporated in the present invention.
Figure 10:
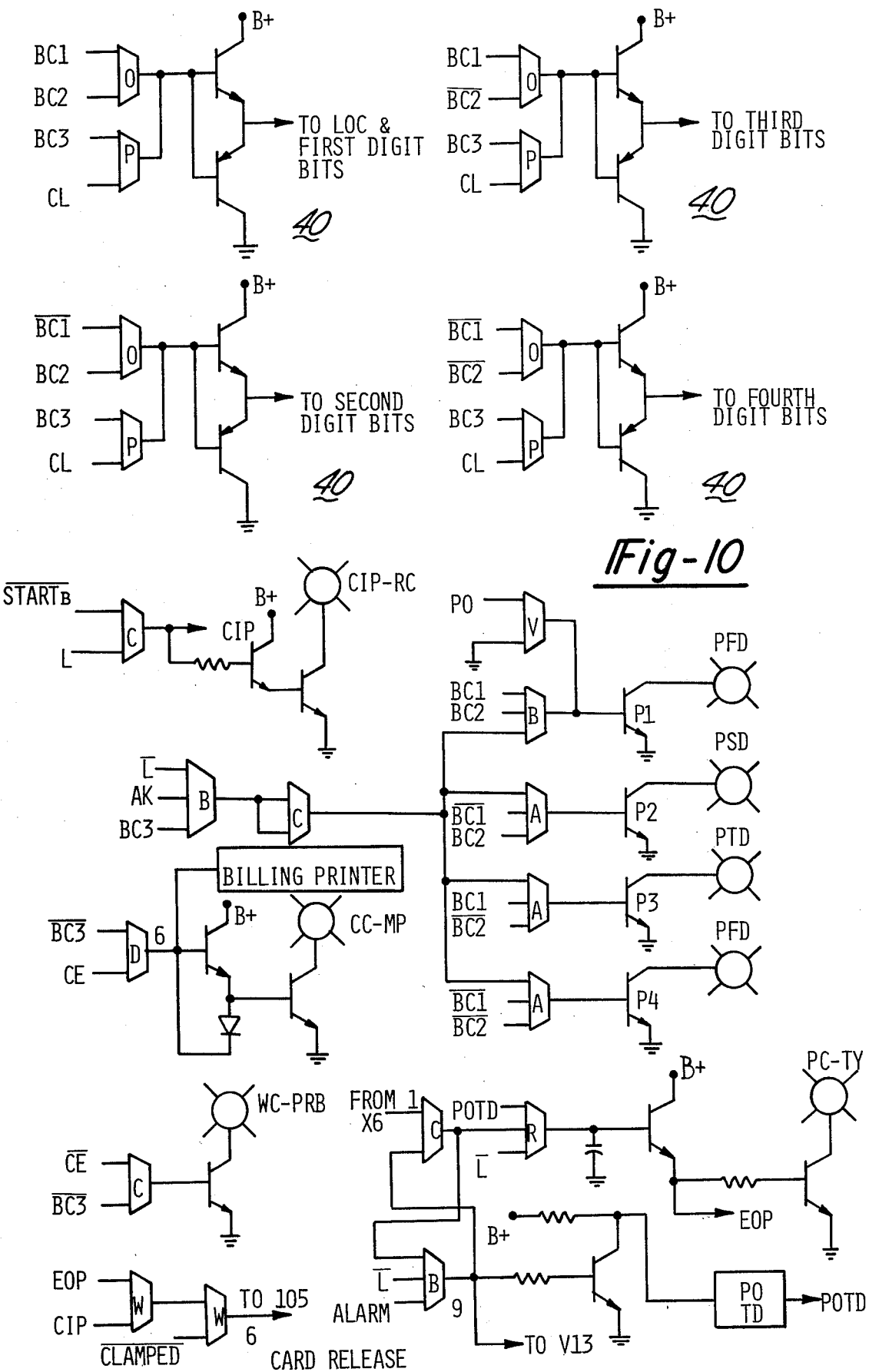

FIG. 5 shows a representative clock used in the present invention and previously shown in block form as the clock 36. The clock 36 includes a pair of transistors 84 and 86 connected in the astable multivibrator mode with load resistors 85 and 87, respectively, and with cross-coupling RC networks 88–90 and 92–94, respectively. There are provided two outputs from the clock stage 36, namely: a $\overline{CL}$ output and a further output from the collector of the transistor 84 through a signal resistor 96 to the base of an amplifier transistor stage 98 and to the output CL terminal as shown. The output from the just mentioned CL terminal serves as a control input to several circuits as are illustrated in FIGS. 5, 9 and 10 hereinafter. The primary function of the clock 36 is to provide a reliable square wave high frequency pulse train to operate the card drivers.

FIG. 6 shows the basic power supply system used to provide bias voltages to the various clock, Schmitt trigger and card driver circuits involved, and further to provide operating voltages for certain of the solenoids and switches involved in the system. An AC input 100 is included at the left side of the FIG. 6 drawing with transformers 102 and 104. Derived from the secondary winding of the transformer 102 is an unfiltered half-wave voltage for the light stages. A filtered DC voltage is further provided from the secondary of the transformer 102 to feed said release card switch 28 and to provide voltages to the start switch and to other push button switches located on the operator's console 20. The secondary of the transformer 104 is used to provide a filtered plus voltage to the lid switch and additional plus voltages to the clock 36 and to the logic circuits. Also included in the circuit of FIG. 6 are a pair of transistors 105 and 107. A resistor 109 serves as the base current limiting resistor for the transistor 107. A second current limiting resistor 111 is connected in series with the lid release solenoid. The transistor 107 is shunted by a protective zener diode 112. A resistor 114 is connected between the lid switch upper contact and ground.

Figure 7:
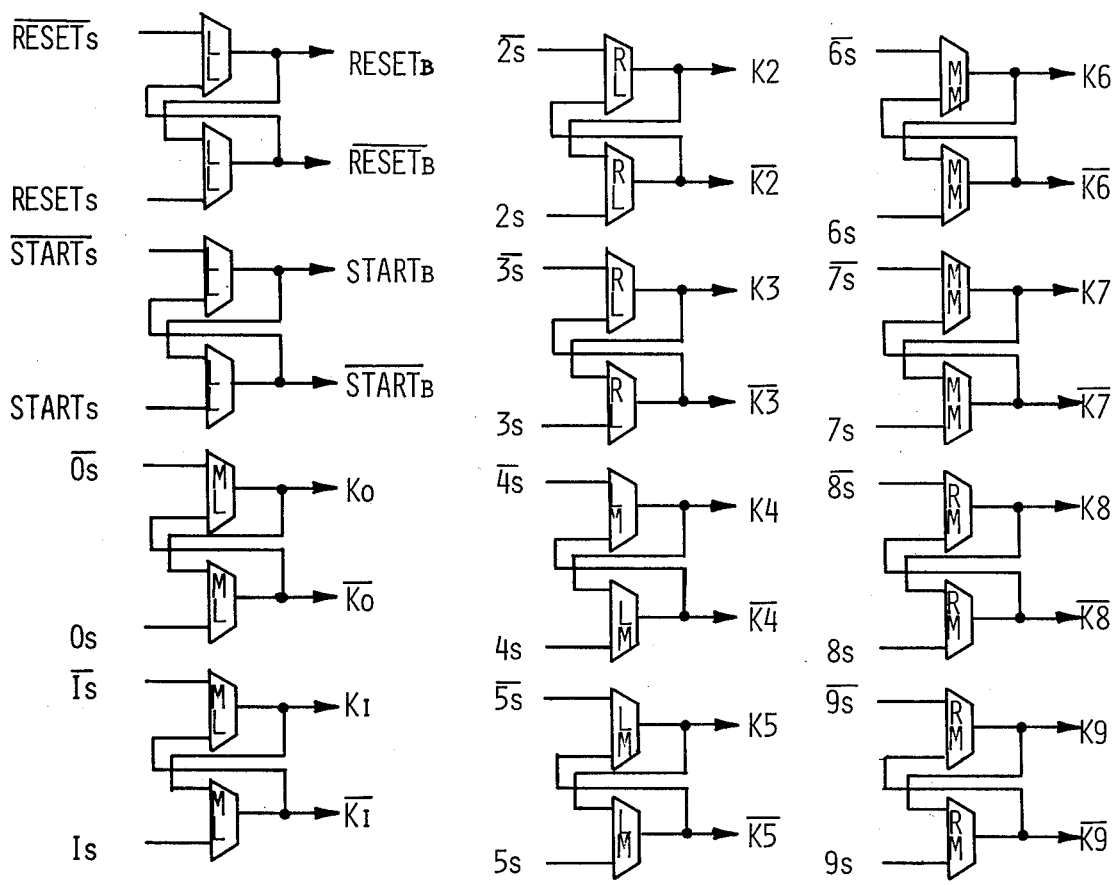
FIG. 7 is a block diagrammatic showing of the switch buffer stages used in connection with the present invention.
Figure 8:
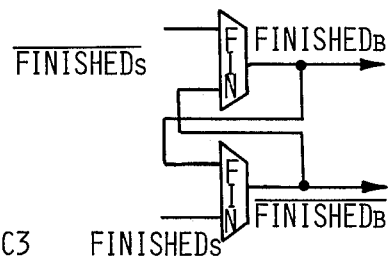
FIG. 8 is a table used to show the terminal connection of the counter used in the present invention.

FIG. 7 shows the buffer stages associated with the "reset", "start", "finished" and "digit" switches. The 13 purchaser's switches, which are push button operated switches, are located on the purchaser console 20. In each case, the buffer stage includes a pair of cross-connected NOR gates, and the output in each case is referred to as a KO, $\overline{KO}$, etc., and these actually refer to the digit key selected by the purchaser from the keyboard before him on the console. The manner in which the various key outputs are used in the logic of the system will be further clarified in connection with FIG. 9 hereinafter. It will be understood that the RTL NOR gates and various other parts of the system referred to may be embodied in the form of DTL or TTL integrated circuits, such as those currently made and sold by a number of commercial manufacturers. Likewise, the logic circuitry could be fabricated from English, NAND or hybrid elements. The above types of logic elements are offered by way of example and not by way of limitation.

Reference is now made to FIGS. 9 and 10. As previously indicated, the present invention includes a binary digit counter with three stages BC1 through BC3 and a second counter referred to as a binary error counter with stages BEC1 through BEC3. The master control for the system is an asychronous multivibrator L, shown in FIG. 9. Before the multivibrator L can be set, the lid 24 over the credit card 22 must be lowered in place so as to be detected by the lid switch 112 shown in FIG. 6. Once the card 22 has been properly inserted in the read station, the locator detector bit $\overline{LO}$ causes the output of the locator Schmitt trigger $\overline{LOC\ ST}$ to go to ground level during the high half of the clock 36 output. Accordingly, when the "start" button is depressed, the L flip-flop will be set if the card 22 is properly inserted. The TC time delay circuit, as was shown in FIG. 4, is to prevent incorrect operation if stray capacitance should operate the associated Schmitt trigger for a short period. If the card 22 is incorrectly positioned, the L flip-flop will remain reset, the CIP-RC light, as shown in FIG. 1, will inform the purchaser to reinsert his card, and the card release solenoid 110 of FIG. 6 will release the card. Also shown in FIG. 9 is the circuitry for converting the digital keyboard decimal inputs K0—K9 into a binary code for comparison with the bit coding already present in the card.

FIG. 10 shows at its upper portion the circuitry used to apply square wave pulses to the encoded indicia on the card. The four drives are identified by numeral 40. A set of four bit sensing flip-flops with outputs labeled BT1 through BT8 are illustrated at the right side of the FIG. 9 drawing. The eight different indicator light previously shown on console 20 in FIG. 1 and the circuitry which actuates one or the other of these is shown in the lower half of the FIG. 10 drawing.

Figure 11:
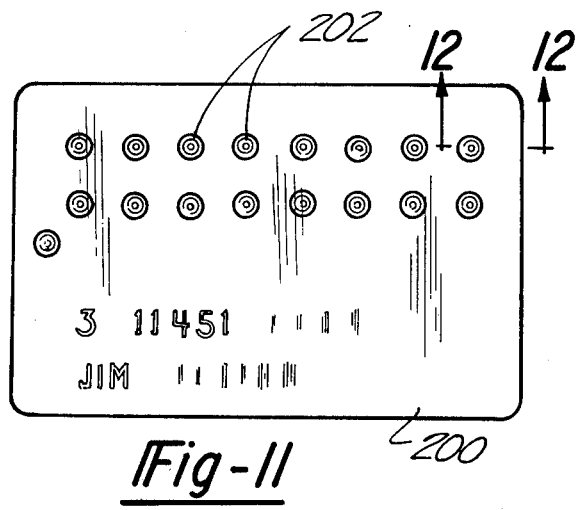
FIG. 11 shows an alternate embodiment of the credit card used in the present invention.
Figure 12:
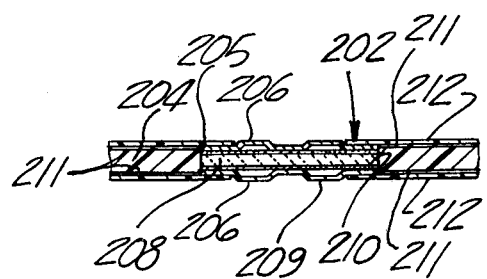
FIG. 12 is a cross-sectional view along the section lines 12—12 of FIG. 11.

FIG. 11 shows an alternate embodiment for the credit card 22 already shown and described in FIGS. 1–3 hereinbefore. The credit card 200 may contain alpha numeric printing, showing the card holder's name, expiration data of the card and like data on the lower portion as shown. Proximate the upper margin of the card 200 there is included a plurality of indicia in a predetermined code pattern. The indicia 202 are shown in section in FIG. 12. It will be seen that the card 200 itself includes a core 204 of vinul material which is relatively rigid. Alternately, the core 204 may be formed of a high impact styrene. The individual coded indicia 202 are differently constructed from those shown, for example, in the card shown in FIG. 3. Each of the indicia 202 include a pair of opposed metal contacts 206. The contacts 206 are preferably formed with a raised ridge or crown portion 209 to extend into position for external sensing. The metal contacts 206 themselves may be formed of aluminum or of similar conductive metallic substances. Between each pair of metal contacts 206 there is included a central dielectric insert 208 which is of a relatively high dielectric constant, for example, of a ceramic material. The two metal contacts 206 are coated with a conductive silicone rubber layer 210 on both sides of the dielectric insert 208 which provides a shock absorbent construction. Depending on the code used, the openings preformed in the core 204 will have high or low capacitance inserts 208. In addition, there is provided a mylar or like polyester film 212 on the outside of the assembly. A further thermo-setting material layer 211 is used to bond the upper and lower films 212 to the core 204. It will be understood that it is possible to use other assemblies and arrangements of elements to provide an encoded indicia. Still further embodiments of the present invention will be shown in FIGS. 15 and 17 hereinafter.

Figure 13:
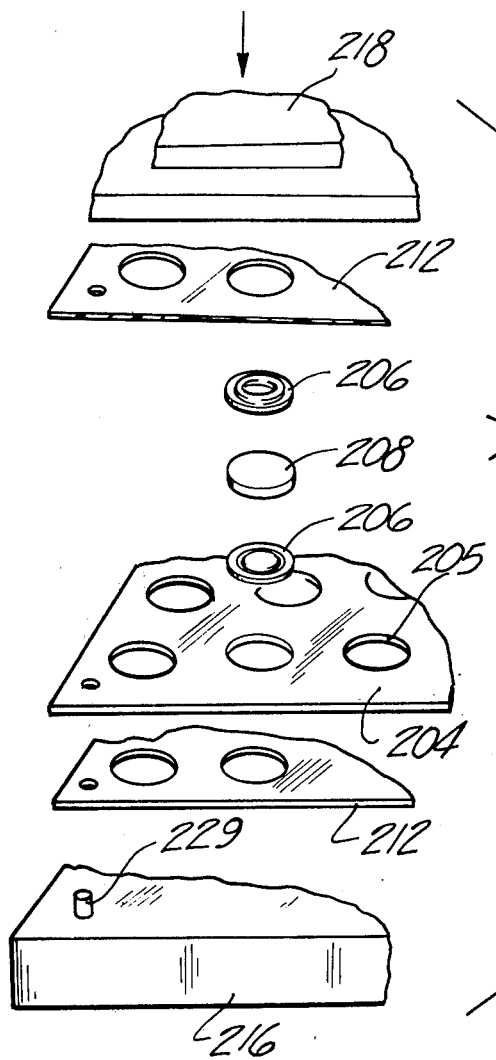
FIG. 13 is a spread perspective view of the credit card of FIG. 11 with the parts arranged to illustrate and clarify the process and steps used in construction of the credit card.

FIG. 13 illustrates the order in which the parts of the indicia 202 of the card 200 are assembled and the general process whereby the card is manufactured. Initially, the bottom film 212 is laid over a plurality of guide pins 229 in the lower half of an assembly jig 216. The core 204 with preformed openings 205 therein is laid on top of the lower film 212 and likewise over the guide pins 229. All of the lower metal contacts 206 are inserted in the openings 205. It will be understood that both the upper and lower jig halves include a plurality of recesses to allow for the protrusion of all the metal contacts 206 through the respective films 212. The capacitor inserts 208 are then inserted in those particular openings 205 in which according to the code they should be inserted. Next, the upper 17 metal contacts 206 are inserted in place. The top film 212 is then inserted over the guide pins 229 on top of the assembly as it is held in the assembly jig 216. The upper half of the assembly jig 218 is then lowered to compass and seal the entire unit under conditions of elevated pressure and temperature for a predetermined time to provide a closed and effective seal of the credit card 200.

Next, the card 200 is trimmed to size about its margin edges. The thermosetting layer 211 may be preapplied to the inner surfaces of the upper and lower films 212.

Figure 14:
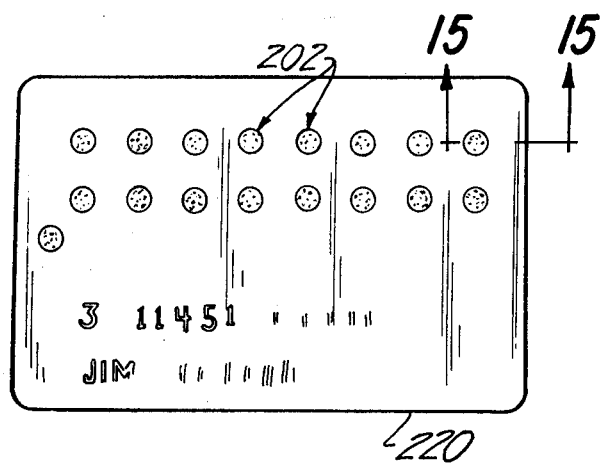
FIG. 14 shows a still further embodiment of the credit card used.

The card 220 of FIG. 14 differs from the card 200 of FIG. 11 in that the metal contacts 206, which form a part of the severalindicia 202, have been replaced with electrically conductive spots formed in the upper and lower outer film layers 212. The conductive spots are identified in FIG. 15 by the numeral 222. The conductive spots 222 may be formed in the films 212 by localized ionization, by inserting conductive carbon particles at each spot, or by other like commercial processes. In the same manner as the embodiment of FIGS. 11–13, there is contained intermediate the conductive parts of the indicia 202 an intermediate high or low dielectric constant insert 224. The remainder of the card 220 as in the prior embodiments includes a central card core 204 with a number of indicia 202 being positioned in a general coded bit arrangement as already explained and shown in connection with FIG. 2 hereinbefore. It will be seen that the construction of the embodiment of FIGS. 14–16 is somewhat simpler, both with respect to its number of components and to its method of fabrication than the prior embodiments shown.

Figure 15:
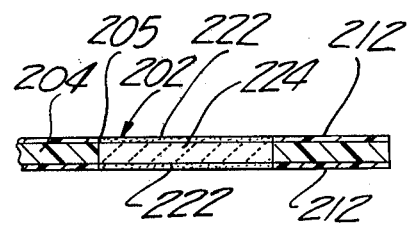
FIG. 15 is a cross-sectional view along the section lines 15—15 of FIG. 14.

With more particular attention to the indicia 202 of FIGS. 14 and 15, the outer conductive spots 222 formed in the predetermined code arrangement also may be embodied as conductive fibers having their axes so positioned as to provide for electrical conduction in vertical directions relative to the card 220, but not in other directions lying along the plane of the card 220.

Figure 16:
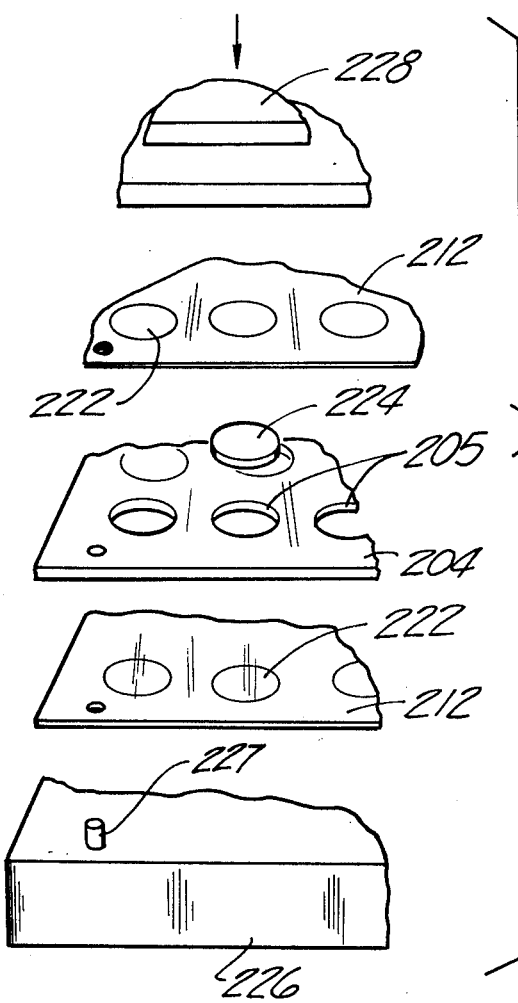
FIG. 16 is a spread perspective view of the credit card of FIG. 14 with the parts arranged in an order to illustrate with clarity the process and steps by which that credit card is constructed.

FIG. 16 illustrates the process by which the coded credit card 220 will be fabricated. The first step comprises placing the lower film 212 over a plurality of locating pins 227 in the lower part of the assembly jig 226. It will be seen that the bottom film 212 has formed in it a plurality of seventeen different conductive spots indicated by the numeral 222. In the next step, the core 204 with preformed openings 205 formed in it is superimposed on the lower film 212 and over the pins 227. A plurality of high or low capacitance inserts 224 in the number and in the positions required for the particular coding are then inserted in the openings 205 in the core 204. Next, the upper film 212 with a like plurality of seventeen conductive spots 222 is laid over the central core 204 and over the pins 227. In the final step, the upper half of the assembly jig 228 is lowered and the entire assembly is sealed under elevated pressure and temperature conditions for a predetermined time period to provide the necessary seal. The last step of trimming to size is then performed. It will be obvious that the alternate embodiment of FIGS. 14–16 has some advantages as compared to the prior two embodiments in its simplicity and in the less stringent requirement for precision.

Figure 17:
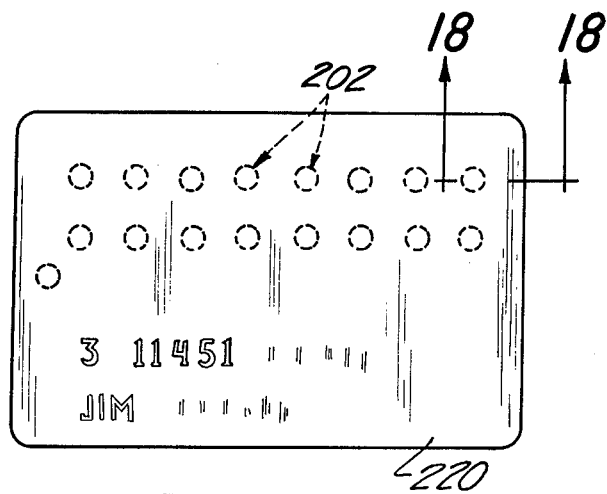
FIG. 17 shows a still further embodiment of the credit card used in the present invention.

The card 220 of FIG. 17 has a different construction as compared to the card 220 of FIG. 14, particularly with respect to the mode of construction of the upper and lower layers 212a of the card. The electrically conductive spots 222 of FIG. 15 are not necessary as localized discrete elements in the embodiment of FIGS. 17–19. Instead, the upper and lower layers 212a include a number of conductive fibers 213 which are aligned in such layers with their axes and thus their paths of electrical conductivity arranged substantially parallel one to the other and in directions basically normal to the surface of the two layers 212a. In this manner, the discrete formation of spots and their precise placement on the upper and lower layers 212a is not required. This greatly simplifies problems of alignment and assembly in the construction of the card 220. It will be understood that other materials capable of "through" conductivity but not lateral conductivity may be employed as layers 212a.

Figure 18:
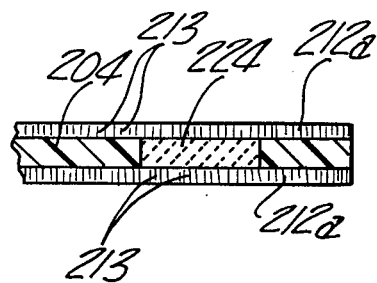
FIG. 18 is a cross-sectional view along the section lines 18—18 of FIG. 17.

As shown in FIG. 18, the remainder of the card includes the core 204 with openings formed therein to provide for inserts such as high and low dielectric constant inserts 224, which in the same manner as in the prior embodiments may be ceramic discs. In a like manner to the embodiments of FIGS. 12 and 15, thermosetting adhesive layers, such as layer 211 of FIG. 12, may be included to improve and secure the bond between the upper and lower layers 212a and the core 204.

Figure 19:
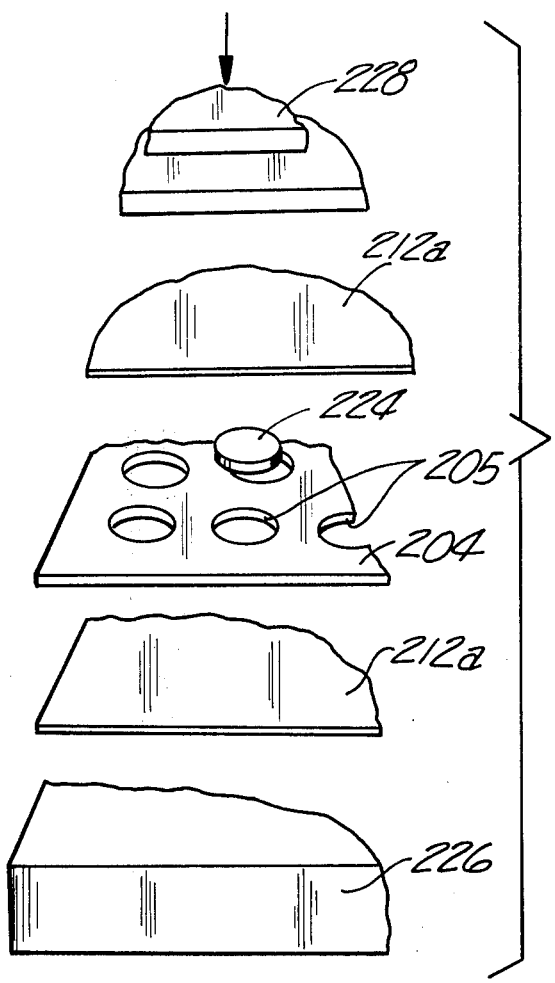
FIG. 19 is a spread perspective view of the credit card of FIG. 17 with the parts arranged in an order to illustrate with clarity the process and steps by which that credit card is fabricated.

FIG. 19 clarifies the manner in which the assembly is made. First, the lower film 212a is placed on the lower half of the assembly jig 226. Next, the intermediate core is placed on top of the lower film 212a and the ceramic discs 224 are inserted in the predetermined code pattern as between high and low dielectric constant inserts. Finally, the upper layer 212a is laid on top of the core and insert array. The upper half of the assembly jig 228 is lowered and under elevated pressure and temperature the sealing of the unitary assembly of the card is accomplished.

DESCRIPTION OF OPERATION

In order to clarify the mode of operation of the system, a typical operating procedure will now be described. At the beginning of the cycle, the purchaser places his credit card 22 in the read station and lowers the lid 24 over the credit card. The credit card, as already indicated, has one section carrying raised alpha numeric indicia which can be placed in alignment with a bill-head to provide necessary bill information. At the margin of the credit card 22, the coded indicia 23 separated in bits representing four different digits provide the verification data. In addition, there is the additional locator bit LO at one side of the credit card to insure proper alignment in the read station.

Once the lid is lowered, the lid switch 112 is made to provide necessary operating voltages to the several clock, Schmitt trigger and following stages in the system. The purchaser next depresses the start button on the console. The start button sets the flip-flop L, which is the master control flip-flop of the system. The flip-flop L is shown in FIG. 9. If the locator bit LO is properly positioned, the feedback is provided from the Schmitt trigger associated with the locator so that there is an input $\overline{LOC\ ST}$ so that an output is provided to energize all of the circuitry. In the event that the credit card has been incorrectly inserted, that is, backward, up-side-down, or otherwise out of alignment, there would be provided a light signal and the CIP-RC light on the console will instruct the purchaser to reinsert his card and the card release solenoid will operate. Once the card has been correctly inserted and the start button actuated, the L flip-flop will be set. It should be noted that when the lid was raised and the L flip-flop was reset, there was a reset provided for the binary digit counter BC to reset it to zero and also the binary error counter BEC was reset to zero. When L is set, the light "push first digit" PFD is lighted on the console. After a digit key has been depressed, the bit sensing flip-flops are set. The pulse output from the clock 36 has already been started by the closing of the lid and passed through the push-pull driver stages 40 illustrated at the upper right hand corner of the FIG. 10 drawing. The information is then being fed back into the Schmitt trigger associated with each of the four different bits and there is, of course, the fifth Schmitt trigger associated with the locator bit LO. The reading process then occurs according to whether a high or low dielectric constant insert 23 or 23a is being sensed with corresponding signal outputs provided as was shown and explained in connection with FIG. 3. With reference to the embodiment of FIGS. 11–13, the output depends on the presence of a low or a high capacitance insert 208. With reference to the embodiment of FIGS. 14–16, the output depends on the presence of a high or low capacitance insert 224.

The situation is provided for where the purchaser makes an error in entering a digit which is supposed to match the previously encoded digit on the credit card. For this purpose, there is provided the reset button on the console to permit the purchaser having made an error to try again. For example, if the purchaser believes the first digit to be a 2, he will push the 2 key on the keyboard 30. This key will operate the buffer stage as shown in FIG. 7 by the key outputs 2S and $\overline{2S}$. The buffer output of the switch 2 is then K2 and $\overline{K2}$. The outputs from the Schmitt triggers are used to set the associated bit flip-flops for the code system used, which in this case is a 1-2-4-8. The flip-flops are thus set initially to agree with the code 1 on the card.

A comparison circuitry stage 41 is included at the lower right hand portion of the FIG. 9 drawing, which is used to compare the buffered coded outputs from the depressed key to the card outputs as read through the system just described. For example, the binary coded outputs from key 2, namely $\overline{C1}$, C2, $\overline{C4}$ and $\overline{C8}$, may be compared with $\overline{BT1}$, BT2, $\overline{BT4}$ and $\overline{BT8}$ during the time of approximately 50 microseconds, while the digit key is depressed. If the comparison process checks out and there is coincidence, there is no set output provided to set the compare error flip-flop CE. However, if there is a discrepancy, the compare error flip-flop CE will be set. Once the purchaser releases the button, the circuit counts-up the binary digit counter BC one count. Once the binary digit counter is counted-up one, it turns on the next light telling him to push the next digit key.

It will be understood that as soon as the digit key was released all of the bit reading flip-flops were reset. When the next digit key is depressed, the cycle just described is repeated. The next four bits are used to set the correct set of the bit sensing flip-flops. This is accomplished at the end of a 50 microsecond period. After the next digit key is depressed, and at the end of a 100 microsecond period, the bit flip-flops are compared in stage 41. If there is coincidence between the two settings, nothing happens. If an error occurred, the compare error flip-flop CE again would be set. Once the compare error flip-flop CE is set, it stays set until the reset button is pushed. When the fourth digit has been completed, the binary digit counter will check the state of the CE flip-flop. One of two conditions will now exist, either the purchaser has made a mistake and the compare error flip-flop CE is set, or no mistake has been made and the compare error flip-flop CE is not set. In the event the compare error flip-flop is set, the "wrong code-push reset button" WC-PRB on the console will become lighted. In the event of an error, the reset button will be pushed again, the binary digit counter and the compare error flip-flop CE would be reset, and the cycle would be repeated. The binary error counter BEC keeps track of how many times the reset button has been pressed, and if, for example, three tries have been made and the count of 3 has been reached in the binary error counter BEC, then the operation may be cut-off. The BEC3 alarm circuitry is illustrated at the lower portion of the FIG. 9 drawing. This alarm signal can be used, for example, to sound an alarm to summon a police cruiser. Also, the alarm condition makes it impossible for the binary digit counter to operate and the purchaser can do no more testing because he cannot progress further than the digit 1. In addition, the card cannot be released since the card release switch 28 is key operated and that key is available only to the attendant to remove the card.

If the choice of the four digits has been made correctly by the purchaser, the "code correct-make purchase" light CC-MP on the console will be lighted and the purchaser can remove the selected articles or amount of material from the vending machine.

At the end of the selection, the credit card holder actuates a "finished" switch, as shown in FIG. 7. This initiates a time delay which permits the operation of an associated printer and allows the print-out of the bill. A signal will normally be provided at the end of the billing print-out called "end of purchase signal" EOP, as shown at the lower right hand part of FIG. 10. Also, a light on the console "purchase complete-thank you" PC-TY will be illuminated. This will provide an output signal from terminal W6 of FIG. 6 to the base of the transistor 105 to energize the lid release solenoid 110. The purchaser will then lift the lid 24. The elevation of the lid provides a $\overline{clamped}$ signal which then is used to reset a number of the components of the system preparatory to the next cycle of operation. It likewise resets the master control flip-flop L and holds the error flip-flop CE reset. The purchaser has then finished and the billing equipment will eject a bill for his records. He will remove the credit card and the system operation is terminated.

It will thus be seen that the present invention provides a novel and greatly improved construction for credit cards. The card in its several different embodiments makes possible an electronically controlled identification verification arrangement whereby, before any vending operation is permitted, the identity of the purchaser is checked out. The system just described makes possible verification of purchaser identification on-the-spot without action by sales attendants and without costly and time consuming check-out through central computer arrangement. It is a system which is particularly versatile in that by simple changes to the card encoding and to the console layout it is possible to eliminate the purchasers who have proved in the past to be poor credit risks. While the novel and improved credit card is particularly suitable and adapted for use in an automatic vending system, our invention is not so limited.

It will be understood that while the preferred embodiment has been disclosed and described as a credit card, the present invention is equally applicable to any of a number of self-identifying cards and related systems.

What is claimed is:

1. A card of the self-identifying type, comprising:

a core of vinyl material having a plurality of openings formed therein in a predetermined pattern;

an upper and a lower polyester layer positionable above and below said core;

an upper and a lower metallic contact positionable in each of said openings and extending through opposed openings preformed in each respective upper and lower layer; and a plurality of high and low dielectric constant inserts positionable between preselected pairs of said contacts in accordance with the code selected.

2. The combination as set forth in claim 1 wherein said upper and lower layers comprise sheets of the mylar material type.

3. The combination as set forth in claim 1 wherein said metallic contacts have included therein raised crown portions for improving the strength of said contacts.

4. The combination as set forth in claim 1 wherein there is further included the upper and lower surfaces of said inserts an electrically conductive silicone layer for improving the impact strength of the card.

5. The combination as set forth in claim 1 wherein the core of said card comprises a vinyl material.

6. The combination as set forth in claim 1 wherein the core is of a high impact resistant styrene material.

7. The combination as set forth in claim 1 wherein said dielectric constant inserts comprise in each case a ceramic material disc.

8. A coded card of the self-identifying type, comprising:

an upper and a lower layer of polyester film material;

an intermediate vinyl core having a plurality of openings formed therethrough in a predetermined code pattern;

a plurality of high and of low capacitance material inserts operable to be inserted in a predetermined number of said openings in conformance with the preselected code; and a like plurality of like positioned electrically conductive spots preformed in both the upper and lower layers in registration with such core openings.

9. The combination as set forth in claim 8 wherein said electrically conductive spots comprise fibers having their axes arranged to provide conductive in a direction normal but not transverse to the plane in which said card is lying.

10. The combination as set forth in claim 8 wherein said conductive spots comprise discrete portions of said layers prepolarized to permit electrical conduction therethrough.

11. The combination as set forth in claim 8 wherein said conductive spots comprise discrete portions of said layers having electrically conductive particles embedded therein.

12. A coded card of the self-identifying type comprising:

an upper and a lower layer, each of said layers including a plurality of electrically conductive fibers having their axes aligned in paths substantially normal to the plane of such layers to permit current flow only in such paths;

an intermediate core of insulating material having a plurality of openings preformed therethrough in a predetermined code pattern; and a plurality of high and of low dielectric constant material inserts in said openings in conformance with a predetermined code.

13. The combination as set forth in claim 12 wherein said inserts comprise ceramic discs.

14. The combination as set forth in claim 12 wherein a plurality of raised alpha numeric indicia are included on the upper layer of said card to provide for direct print-out.

15. A coded card of the self-identifying type, comprising:

an upper and a lower layer, each of said layers comprising a material having an electrical conductive capability in directions substantially normal to the plane of each such layer but not in directions parallel thereto;

an intermediate core of insulating material having a plurality of openings preformed therethrough in a predetermined code pattern; and a plurality of high and of low dielectric constant inserts positioned in said openings in accordance with a predetermined code.

* * * * *